(12) United States Patent
Vincent

(10) Patent No.: US 7,900,528 B2
(45) Date of Patent: Mar. 8, 2011

(54) APPARATUS WITH MULTIPLE SENSORS WHEREIN THE SENSORS ARE CONNECTED IN SEPARATE SEALED SOCKETS

(75) Inventor: David Robert Vincent, West Moors (GB)

(73) Assignee: Intellitect Water Ltd., Christchurch (GB)

( * ) Notice: Subject to any disclaimer, the term of this patent is extended or adjusted under 35 U.S.C. 154(b) by 446 days.

(21) Appl. No.: 12/087,630

(22) PCT Filed: Jan. 10, 2007

(86) PCT No.: PCT/GB2007/000050
§ 371 (c)(1),
(2), (4) Date: Jul. 10, 2008

(87) PCT Pub. No.: WO2007/080393
PCT Pub. Date: Jul. 19, 2007

(65) Prior Publication Data
US 2008/0314171 A1 Dec. 25, 2008

(30) Foreign Application Priority Data
Jan. 13, 2006 (GB) .................................. 0600721.5

(51) Int. Cl.
*G01D 21/00* (2006.01)
(52) U.S. Cl. ............................................... 73/866.5
(58) Field of Classification Search .................. 73/866.5
See application file for complete search history.

(56) References Cited

U.S. PATENT DOCUMENTS

| 5,233,860 A * | 8/1993 | Mori et al. ....................... 73/19.1 |
| 6,779,383 B2 * | 8/2004 | Lizotte et al. .................. 73/61.48 |
| 6,938,506 B2 * | 9/2005 | Henry et al. ................... 73/866.5 |
| 2003/0177851 A1 | 9/2003 | Henry et al. |

FOREIGN PATENT DOCUMENTS

| EP | 1 415 698 | * | 5/2004 |
| EP | 1415698 A | | 5/2004 |
| WO | WO 2007/061833 A | | 5/2007 |

* cited by examiner

*Primary Examiner* — Hezron Williams
*Assistant Examiner* — Nathaniel Kolb
(74) *Attorney, Agent, or Firm* — Iandiorio Teska & Coleman

(57) ABSTRACT

Apparatus (2) for sensing parameters, which apparatus (2) comprises a housing (4), a plurality of sockets (6) in the housing (4), a sensor (8) in each of the sockets (6), first electrical contacts (10) on the sensor (8), and second electrical contacts (12) in each socket (6) at an end of the socket (6) remote from the sensor (8), and the apparatus (2) being such that: (i) the sensors (8) are for sensing different parameters; (ii) the sockets (6) are such that when they contain their sensors (8) then the sockets (6) are sealed from each other whereby a liquid caused to be present in a socket (6) consequent upon an operator error is unable to pass to the other sockets (6); (iii) the second electrical contacts (12) define the type of sensor (8) that is appropriate for each socket (6); and (iv) the sensors (8) each comprise a flat sensor part (14), a transversely extending mounting part (16), and a body part (18), the transversely extending mounting part (16) being located in a bore in the body part (18), and the body part (18) being sealingly located in the socket (6) for the sensor (8).

14 Claims, 6 Drawing Sheets

APPARATUS WITH MULTIPLE SENSORS WHEREIN THE SENSORS ARE CONNECTED IN SEPARATE SEALED SOCKETS

This invention relates to apparatus for sensing parameters, for example environmental parameters.

Apparatus for sensing environmental parameters are well known. One such type of apparatus is known as a sonde and it is used for in-situ monitoring of environmental or process parameters, for example water quality in rivers or in distribution networks. The water quality may be monitored for dissolved oxygen content, temperature, pH, conductivity, or pressure. Typical known apparatus incorporates a large number of sensors, with each sensor being, for example, 100 mm diameter ×300 mm long. The known apparatus may have a threaded connection and O-ring seals for protecting against water ingress. U.S. Pat. No. 6,938,506 described one such apparatus.

The apparatus of U.S. Pat. No. 6,938,506 suffers from deficiencies which are not acceptable for the deployment of a large number of pieces of the apparatus, where operator time and skills may not be sufficient for quick and effective installation of the pieces of apparatus. More specifically, the USA patent discloses a sonde with a number of connectors that provide a seal to the bottom of a sensor forming part of the sonde. The sensor is located in a socket and each sensor socket, is connected by a hole in order to provide a means for releasing air that becomes trapped during insertion of the sensor in its sensor socket. If the sonde is placed in water and one of the sockets is not provided with a sensor, then water is able to reach all of the connectors due to the connecting holes. Furthermore, the connector design used in the USA patent is quite complex, and this, by increasing unit cost, restricts the number of sensors that can be installed. For efficient mass production of sensors, it is convenient to manufacture them in the same body, possibly using an appropriate mass production technique such for example as thick or thin film processing. The sensors are planar, and are therefore not ideal for incorporation into a sensor body with no protrusions or features to the front of the sensor chip for making connections or retention. If large numbers of sondes are going to be installed, it is important to make servicing and maintenance as easy as possible. If a sonde is deployed in water with a sensor that is missing from its socket, then water ingress should be limited to that socket only. Also, there should be no complex or moving parts inside the socket that cannot be replaced. Further, it should not be possible to insert a sensor in the wrong way in its socket, or in an incorrect socket. Further, the sensor body should minimise the amount of compression from trapped air, in order to enable the sensors securely to be retained in their sockets.

It is an aim of the present invention to obviate or reduce the above mentioned problems.

Accordingly, in one non-limiting embodiment of the present invention there is provided apparatus for sensing parameters, which apparatus comprises a housing, a plurality of sockets in the housing, a sensor in each of the sockets, first electrical contacts on the sensor, and second electrical contacts in each socket at an end of the socket remote from the sensor, and the apparatus being such that:
  (i) the sensors are for sensing different parameters;
  (ii) the sockets are such that when they contain their sensors then the sockets are sealed from each other whereby a liquid caused to be present in a socket consequent upon an operator error is unable to pass to the other sockets;
  (iii) the second electrical contacts define the type of sensor that is appropriate for each socket; and
  (iv) the sensors each comprise a flat sensor part, a transversely extending mounting part, and a body part, the transversely extending mounting part being located in a bore in the body part, and the body part being sealingly located in the socket for the sensor.

The apparatus of the present invention is able to be economically manufactured using standard low-cost methods and components. This keeps manufacturing costs to a minimum and thereby cost is not a bar to widespread use of the apparatus, for example in a potable water distribution system.

The apparatus of the present invention is able to reduce operator error during installation and maintenance because the second electrical contacts define the type of sensor that is appropriate for each socket. The sensors can be miniature sensors and smaller than usually used. For example, the miniature sensors may be 8 mm diameter and 20 mm long.

In the event that the apparatus of the present invention is placed in a liquid, for example water, with one of the sockets not containing a sensor, then the liquid is only able to pass to the components in that particular socket and the liquid does not pass to other sockets.

The formation of the sensors with the flat part and the transversely extending mounting part enables the sensors easily and permanently to be mounted in the body part. The entire sensor construction is robust and the actual flat sensor part is not likely to separate from the remainder of the sensor in use of the apparatus of the present invention.

The plurality of sensors enables a wide variety of parameters to be sensed. With the use of miniature sensors, the overall size of the apparatus of the present invention is small compared with known apparatus, and thus the apparatus of the present invention is able to be installed in small spaces where known apparatus might be too large.

The apparatus may be one in which the body part is a tubular body part having a first groove containing a first O-ring seal. In this case, the sockets may be sized to minimise pressure of trapped air behind the first O-ring seal.

The apparatus may be one in which the tubular body part has a second groove containing a second O-ring seal.

The body part may be made of a plastics material. The plastics material may be polyetheretherketone or poly (p-phenylene sulphide).

Preferably, the electrical contacts are sprung electrical contacts.

The apparatus may be one in which the sprung electrical contacts each comprise a sprung pin mounted in a mounting member, and in which the mounting member is located in the bore in the body part of the sensor.

The apparatus may be one in which the flat sensor part is made of a ceramic material, in which the transversely extending mounting part is made of a ceramic material, and in which the two ceramic materials are thermally expansion-matched. This thermal expansion-matching ensures that the flat sensor part does not tend to work loose from the transversely extending mounting part due to different thermal expansions during conditions of use of the apparatus of the present invention.

Preferably, the transversely extending part is a tube. Other formations for the transversely extending part may however be employed if desired.

The apparatus of the present invention may include a printed circuit board, the second electrical contacts being such that they connect to the printed circuit board.

The first electrical contacts will usually be connected to the second electrical contacts by conductors. The conductors are preferably wires but other types of conductors may be employed.

The first electrical contacts may be electrical contact pads.

The apparatus may be such that there are eight of the sensors. More or less of the sensors may be employed.

The sensors may be such that their flat sensor part is mass produced by printing onto a ceramic substrate, for example a ceramic substrate of 5×5 ×0.625 mm. The sensing side of the flat sensor may be connected to the remainder of the sensor via a number of through-plated holes. The transversely extending mounting part may be secured to the flat sensor part using an appropriate adhesive, for example an appropriate ceramic adhesive when the flat sensor part and the transversely extending mounting part are both made of a ceramic material. Use of the transversely extending mounting part in the body part enables the forces on the flat sensor to be taken by the mounting part, and these forces can be distributed over a much larger area than would be the case if the flat sensor were mounted directly in the body part. The forces may be compressive forces instead of shear forces.

An advantage of using printed sensors is that they are able to be mounted inside small sensor bodies, leading to an overall more compact apparatus design. With a small sensor body part, the body part may be of insufficient length to accommodate a pair of O-ring seals in a conventional way. Compression of trapped air may prevent safe insertion of a sensor in its socket. It is not desirable to have holes to other sensor connections in order to ensure that a liquid in one socket is not able to pass to other sockets. When the apparatus of the present invention has the second O-ring seal, then the second O-ring seal is preferably mounted as near as possible to the top of the sensor. The use of the first and the second seals is effective to minimise trapped air, and ensures adequate sensor retention and sealing. The first seal is at the bottom of the cavity, and the second seal advantageously only engages fully when the sensor is fully inserted. This may be effected by having the distance to the O-ring groove only just less than the depth of the hole.

In one embodiment of the invention, the sprung pins may be mounted in the body of the sensor such that the tip is recessed. The corresponding electrical contacts are arranged in a unique configuration for each sensor type, such that full insertion of the sensor is not possible unless the corresponding contacts are in the correct configuration (plug-socket, with the plug formed by surface mounted contacts). Since full insertion of the sensor is required for the O-ring seal to engage fully, and the sensor is not retained in the socket unless the O-ring is engaged fully, this forms an effective apparatus for "keying" the correct sensor to the correct hole.

In addition to the simple keying of the contacts at the bottom of the sensor, the apparatus of the present invention may include a second location aid at the top of the sensor body for locating each sensor in its sockets. This second location aid may extend beyond the diameter of the sensor socket, in order to provide a means for leverage when extracting a sensor from its socket for replacement purposes. One side of this head may be flat, and may locate against a feature in the middle of the sensor head. If the sensor is incorrectly orientated, interference with the central feature prevents insertion. Any incorrect sensor then trying to be pushed into a sensor socket will not push fully into the sensor socket, and will not be retained by the second O-ring seal.

The apparatus may be one in which the printed circuit board is held against a seal such for example as a moulded gasket. This seal may also provide retention of sensors, and it may help to isolate each socket from the other sockets in order to prevent unwanted liquid intrusion. The liquid may be water or any other suitable and appropriate liquid.

The second location aid may be a second orientation key.

The sensors may each be such that they are 8 mm in diameter, with a head which is 9 mm. The sensors may be 20 mm in total length. A thick film on ceramic substrate printed sensor may be 5 mm×5 mm×0.625 mm.

An embodiment of the invention will now be described solely by way of example and with reference to the accompanying drawings in which.

Figure 1:
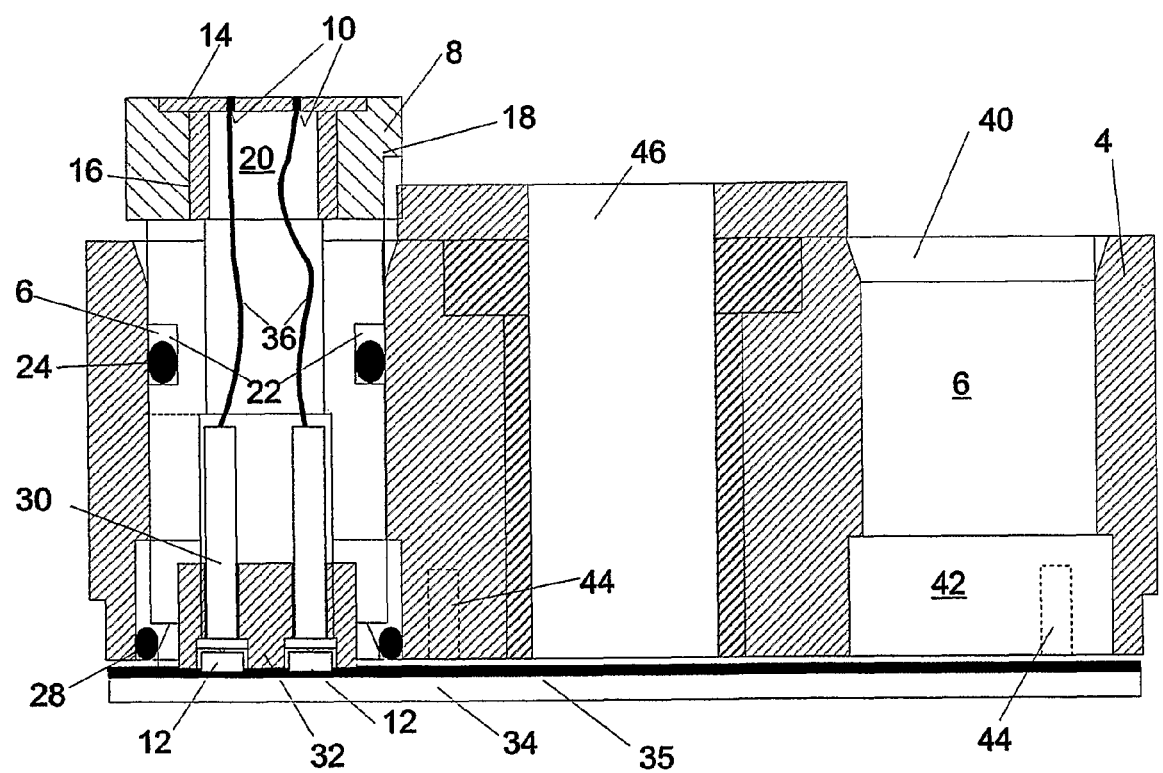
FIG. 1 is a section through apparatus of the present invention.
Figure 2:
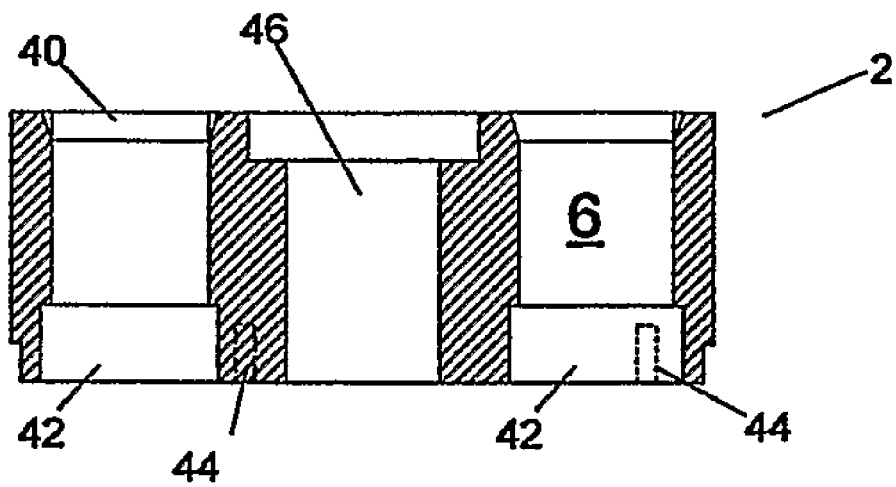
FIG. 2 is a section through a housing forming part of the apparatus shown in FIG. 1.
Figure 3:
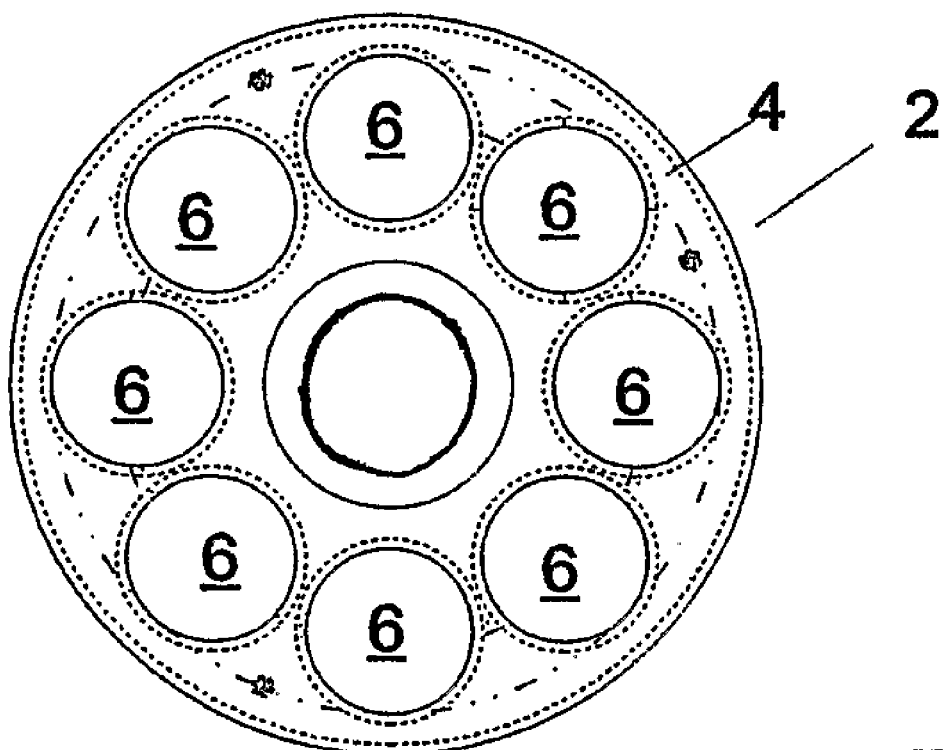
FIG. 3 is a plan view of the housing shown in FIG. 2.
Figure 4:
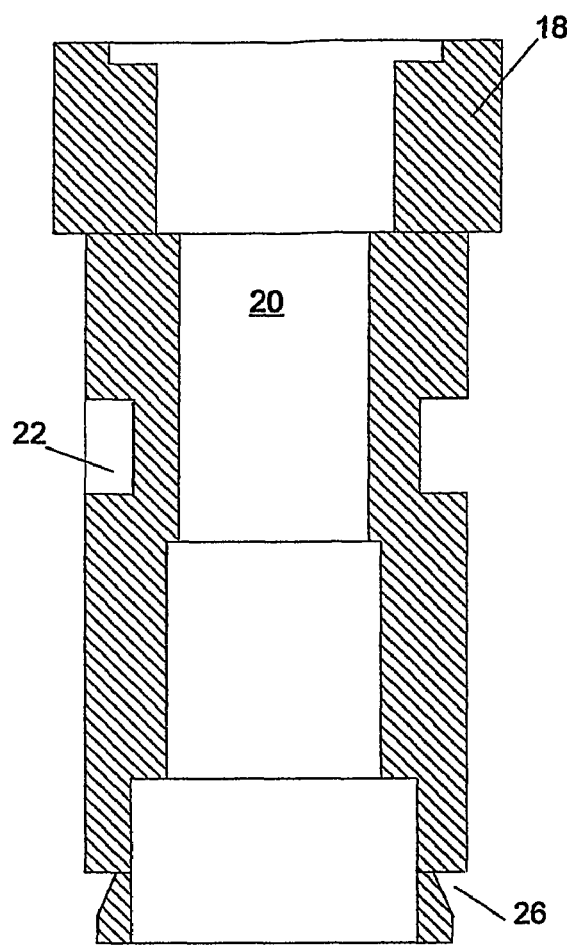
FIG. 4 is a section through a body part of a sensor, the body part being shown in FIG. 1.
Figure 5:
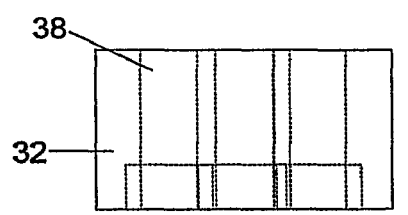
FIG. 5 is a section through a mounting member for mounting sprung pin electrical contacts, the mounting member being shown in FIG. 1.

Referring to the drawings, there is shown apparatus 2 for sensing parameters, for example chlorine or conductivity. The apparatus 2 comprises a housing 4 and a plurality of sockets 6 in the housing 4. A sensor 8 is located in each socket. The apparatus 2 has first electrical contacts 10 on the sensor 8. The apparatus 2 has second electrical contacts 12 at an end of the socket 6 remote from its sensor 8. The sensors 8 are for sensing different parameters. Typically these parameters are chlorine content, dissolved oxygen content, conductivity, redox or pH.

The sockets 6 are such that, when they contain their sensors 8, then the sockets 6 are sealed from each other. Thus a liquid such for example as water caused to be present in a socket 6 consequent upon an operator error, is unable to pass to the other sockets 6. The operator error may be incorrectly securing a sensor 8 in its socket 6, or it may simply be immersing the apparatus 2 in a liquid without first placing a sensor 8 in each one of the sockets 6, i.e. so that there is an empty socket 6.

The second electrical contacts 12 define the type of sensor 8 that is appropriate for each socket 6. Thus each sensor 8 is for sensing a different parameter, and each specific sensor 8 can only fit into the correct one of the plurality of sockets 6. This helps to facilitate use and maintenance of the apparatus 2 by relatively unskilled persons.

The sensors 8 each comprise a flat sensor part 14, a transversely extending mounting part 16 and a body part 18. The transversely extending mounting part 16 is located in a bore 20 of the body part 18. The body part 18 is sealingly located in the socket 6 or the sensor 8.

In FIG. 1, for ease of understanding, the right hand socket 6 has been shown empty, whilst the left hand socket 6 has been shown provided with the sensor 8 and the first and second electrical contacts 10, 12 respectively.

The body part 18 is a tubular body part 18 having a first groove 22 obtaining a first O-ring seal 24. The tubular body part 18 has a second groove 26 containing a second O-ring seal 28. It will be noted that the first groove 22 is rectangular in cross sectional shape whereas the second groove 26 is of a V-shaped in cross section.

The body part 18 is made of a plastics material, typically polyetheretherketone or poly(p-phenylene sulphide)

The second electrical contacts 12 are surface mount electrical contacts. The surface mount electrical contacts each comprise a sprung pin 30 mounted in a mounting member 32. The mounting member 32 is located in the bore 20 of the body part 18 of the sensor 8.

The flat sensor part 14 is made of a ceramic material. The transversely extending mounting part 16 is also made of a ceramic material. The two ceramic materials are thermally expansion-matched, in order to ensure that temperature variations encountered by the apparatus 2 during its use do not cause different expansions of the flat sensor part 14 and the transversely extending mounting part 16, leading to the flat sensor part 14 becoming loose on the transversely extending mounting part 16. The flat sensor part 14 is stuck with an appropriate adhesive 15 to the transversely extending mounting part 16. As can be seen from the drawings, the transversely extending mounting part 16 is in the form of a tube.

The apparatus 2 includes a printed circuit board 34. The second electrical contacts 12 connect to the printed circuit board 34. The printed circuit board 34 is held against a seal in the form of a gasket 35.

The first electrical contacts 10 are connected to the second electrical contacts 12 by conductors in the form of wires 36. The first electrical contacts 10 are electrical contact pads.

The apparatus 2 is such that there are eight of the sensors 8 in eight of the sockets 6.

The apparatus 2 is of circular construction. The apparatus 2 is able to be produced in a small and compact size. The apparatus 2 is also able economically to be manufactured in comparison with known apparatus for sensing parameters.

Figure 6:
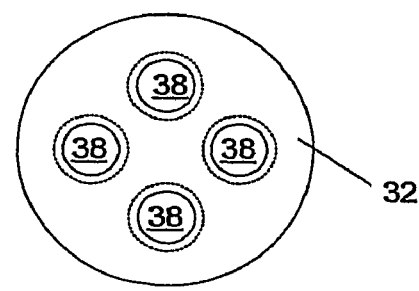
FIG. 6 is a plan view of the mounting member shown in FIG. 5.
Figure 7:
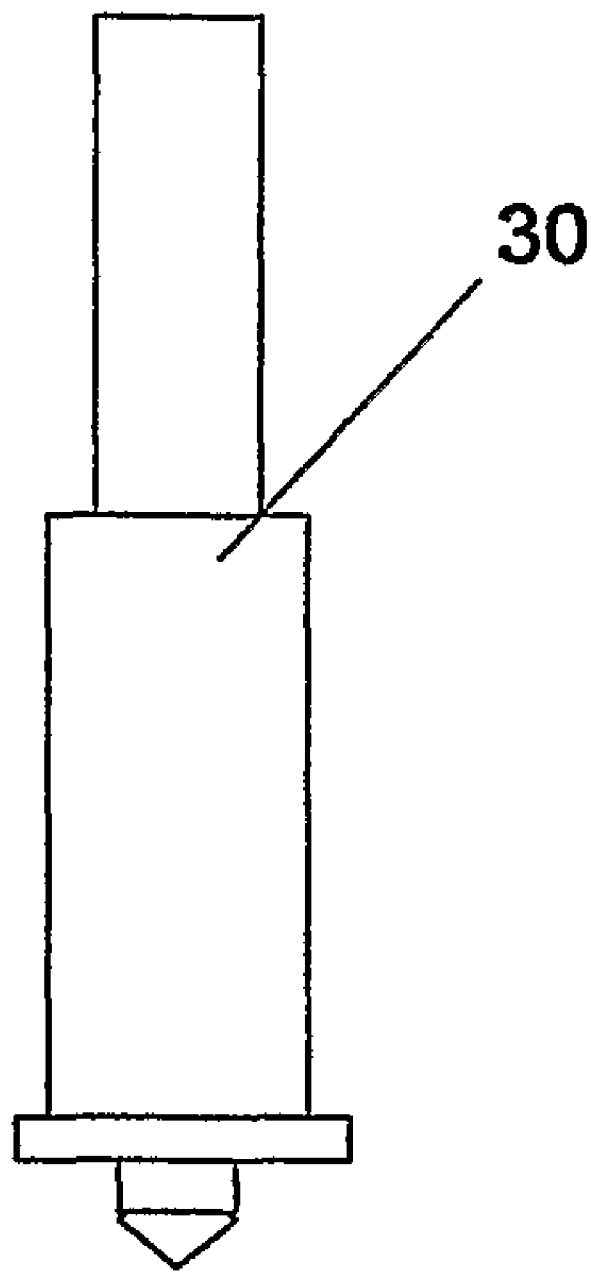
FIG. 7 shows a sprung pin mounting member for being mounted in the mounting member shown in FIGS. 5 and 6.
Figure 8:
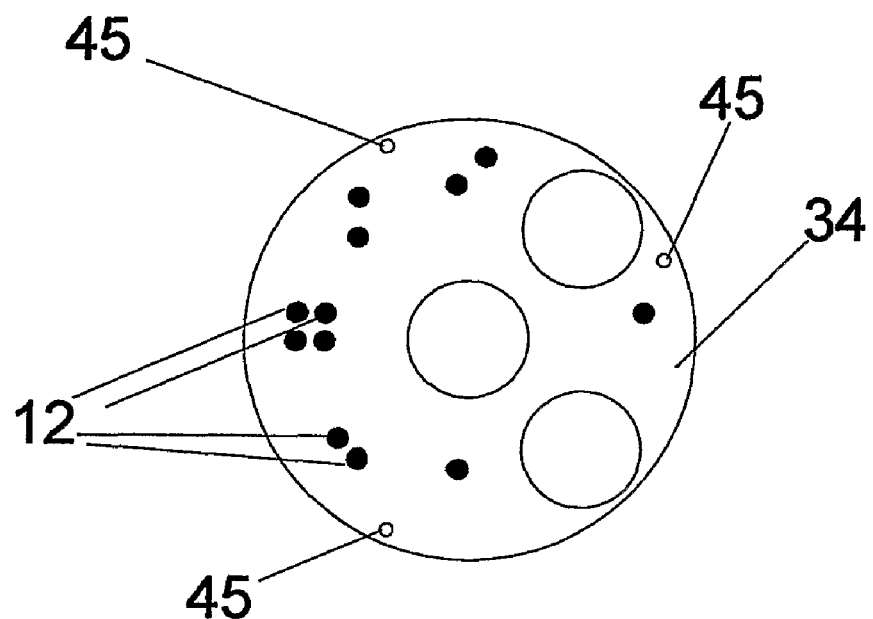
FIG. 8 is a plan view of printed circuit board forming part of the apparatus shown in FIG. 1.
Figure 9:
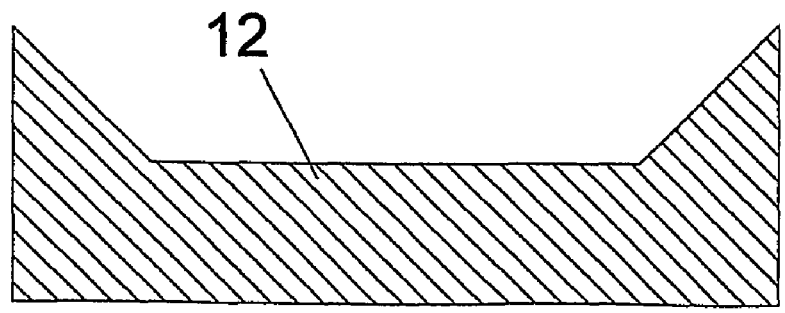
FIG. 9 is an enlarged sectional view through one of the contacts on the printed circuit board shown in FIG. 8.
Figure 10:
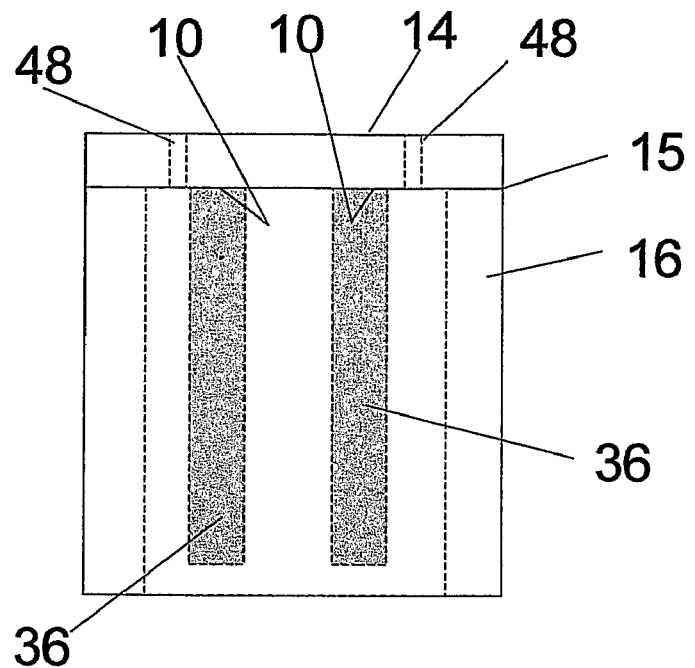
FIG. 10 is a section through part of a sensor as shown in FIG. 1, the part of the sensor being a flat sensor part and a transversely extending mounting part.
Figure 11:
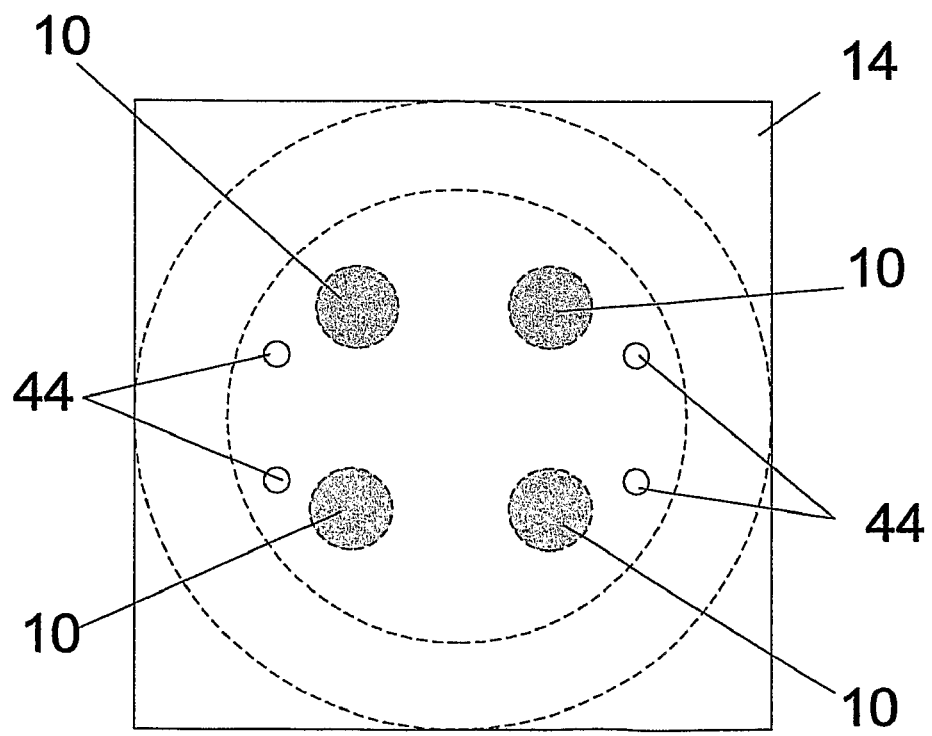
FIG. 11 is an enlarged view of the part of the sensor as shown in FIG. 10.

During assembly of the apparatus 2, the sensors 8 are inserted into their socket 6. As shown in FIG. 6, the mounting member 32 has four bores 38, each for receiving one of the sprung pins 30. If a bore 38 is not required, then it is filled to prevent full insertion of a wrong sensor type. The electrical contacts 12 are soldered to the printed circuit board 34. The housing 4 is such that each socket 6 has a lead-in portion 40 for facilitating insertion of the sensor 8. Each socket 6 also has an enlarged portion 42 for reducing the pressure increase that occurs as a result of placing the sensor 8 in the socket 6. Blind holes 44 line up with holes 45 in the printed circuit board 34 for easy assembly. Short pins that would locate in these holes and go into other parts of the assembly are not shown. A central bore 46 is for a stainless steel rod (not shown) which is used to pull the component parts together. This compresses the stock of components and the gaskets. The stirrer shaft is located in the middle.

The flat sensor part 14 has a number of through-plated holes 48 to make electrical contact between the electrical contact 10 and the front of the flat sensor part 14. The electrical contact 10 may be a contact pad.

It is to be appreciated that the embodiment of the invention described above with reference to the accompanying drawings has been given by way of example only and that modifications may be effected. Thus, for example, the housing 4 and the socket 6 may be of different shapes to those shown. The apparatus of the present invention may be a sonde or any other suitable and appropriate type of apparatus.

The invention claimed is:

1. Apparatus for sensing parameters, which apparatus comprises a housing, a plurality of sockets in the housing, a sensor in each of the sockets, first electrical contacts on the sensor, and second electrical contacts in each socket at an end of the socket remote from the sensor, and the apparatus being such that:
   (i) the sensors are for sensing different parameters;
   (ii) the sockets are such that when they contain their sensors then the sockets are sealed from each other whereby a liquid caused to be present in a socket consequent upon an operator error is unable to pass to the other sockets;
   (iii) the second electrical contacts define the type of sensor that is appropriate for each socket; and
   (iv) the sensors each comprise a flat sensor part, a traversely extending mounting part, and a body part, the traversely extending mounting part being located in a bore in the body part, and the body part being sealingly located in the socket for the sensor.

2. Apparatus according to claim 1 in which the body part is a tubular body part having a first groove containing a first O-ring seal.

3. Apparatus according to claim 2 in which the sockets are sized to minimize pressure trapped air behind the first O-ring seal.

4. Apparatus according to claim 2 in which the tubular body part has a second groove containing a second O-ring seal.

5. Apparatus according to claim 1 in which the body part is made of a plastics material.

6. Apparatus according to claim 1 in which the second electrical contacts are sprung electrical contacts.

7. Apparatus according to claim 6 in which the sprung electrical contacts each comprise a sprung pin mounted in a mounting member, and in which the mounting member is located in the bore in the body part of the sensor.

8. Apparatus according to claim 1 in which the flat sensor part is made of a ceramic material, in which the transversely extending mounting part is made of a ceramic material, in which the two ceramic materials are thermally expansion-matched.

9. Apparatus according to claim 1 in which the transversely extending part is a tube.

10. Apparatus according to claim 1 and including a printed circuit board, the second electrical contacts being such that they are connected to the printed circuit board.

11. Apparatus according to claim 1 in which the first electrical contacts are connected to the second electrical contacts by conductors.

12. Apparatus according to claim 11 in which the conductors are wires.

13. Apparatus according to claim 1 in which the first electrical contacts are electrical contact pads.

14. Apparatus according to claim 1 in which there are eight of the sensors.

* * * * *